US009893897B2

United States Patent
Li et al.

(10) Patent No.: US 9,893,897 B2
(45) Date of Patent: Feb. 13, 2018

(54) ENCRYPTED DATA INSPECTION IN A NETWORK ENVIRONMENT

(71) Applicant: Intel Corporation, Santa Clara, CA (US)

(72) Inventors: Xiaoning Li, Hillsboro, OR (US); Karanvir S. Grewal, Hillsboro, OR (US); Geoffrey H. Cooper, Palo Alto, CA (US); John R. Guzik, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 14/929,476

(22) Filed: Nov. 2, 2015

(65) Prior Publication Data

US 2016/0173288 A1    Jun. 16, 2016

Related U.S. Application Data

(63) Continuation of application No. 13/656,406, filed on Oct. 19, 2012, now Pat. No. 9,176,838.

(51) Int. Cl.
*H04L 9/32* (2006.01)
*G06F 11/30* (2006.01)
(Continued)

(52) U.S. Cl.
CPC ............ *H04L 9/3273* (2013.01); *G06F 11/30* (2013.01); *G06F 21/00* (2013.01);
(Continued)

(58) Field of Classification Search
CPC ............... H04L 9/3273; H04L 63/0428; H04L 63/0464; H04L 63/0227; H04L 2209/24;
(Continued)

(56) References Cited

U.S. PATENT DOCUMENTS 5,835,726 A * 11/1998 Shwed ................. H04L 9/3247
709/229
6,167,136 A    12/2000 Chou
(Continued)

FOREIGN PATENT DOCUMENTS

CN    1697373      11/2005
CN    101043335     9/2007
(Continued)

OTHER PUBLICATIONS

First Office Action and Search Report received for Chinese Patent Application No. 201380048778.3, dated Aug. 31, 2016, with English translation, 37 pages.
(Continued)

*Primary Examiner* — Matthew Smithers
(74) *Attorney, Agent, or Firm* — Patent Capital Group

(57) ABSTRACT

Technologies are provided in example embodiments for analyzing an encrypted network flow. The technologies include monitoring the encrypted network flow between a first node and a second node, the network flow initiated from the first node; duplicating the encrypted network flow to form a copy of the encrypted network flow; decrypting the copy of the encrypted network flow using a shared secret, the shared secret associated with the first node and the second node; and scanning the network flow copy for targeted data.

21 Claims, 8 Drawing Sheets

(51) Int. Cl.
*G06F 21/00* (2013.01)
*H04L 29/06* (2006.01)

(52) U.S. Cl.
CPC ...... H04L 63/0227 (2013.01); H04L 63/0428 (2013.01); H04L 63/0464 (2013.01); *H04L 63/0281* (2013.01); *H04L 63/166* (2013.01); *H04L 2209/24* (2013.01)

(58) Field of Classification Search
CPC ... H04L 63/0281; H04L 63/166; G06F 21/00; G06F 11/30
See application file for complete search history.

(56) References Cited

U.S. PATENT DOCUMENTS

| | | | |
|---|---|---|---|
| 6,546,486 B1* | 4/2003 | Perlman | H04L 63/0209 380/281 |
| 6,963,976 B1 | 11/2005 | Jutla | |
| 6,983,366 B1 | 1/2006 | Huynh et al. | |
| 7,007,163 B2 | 2/2006 | Tardo et al. | |
| 7,055,027 B1* | 5/2006 | Gunter | H04L 63/30 709/223 |
| 7,093,126 B1 | 8/2006 | Jutla | |
| 7,110,545 B2 | 9/2006 | Furuya et al. | |
| 7,178,025 B2 | 2/2007 | Scheidt et al. | |
| 7,188,365 B2 | 3/2007 | Balissat et al. | |
| 7,231,517 B1 | 6/2007 | Mashayekhi | |
| 7,266,703 B2 | 9/2007 | Anand et al. | |
| 7,281,128 B2 | 10/2007 | Mikel et al. | |
| 7,350,076 B1 | 3/2008 | Young et al. | |
| 7,373,826 B2 | 5/2008 | Weber et al. | |
| 7,448,081 B2 | 11/2008 | Balissat et al. | |
| 7,487,365 B2 | 2/2009 | England et al. | |
| 7,490,350 B1 | 2/2009 | Murotake et al. | |
| 7,516,485 B1* | 4/2009 | Lee | H04L 63/0209 713/153 |
| 7,543,142 B2 | 6/2009 | Sydir et al. | |
| 7,685,434 B2 | 3/2010 | Kaniz et al. | |
| 7,725,719 B2 | 5/2010 | Sandberg et al. | |
| 7,797,745 B2 | 9/2010 | Han et al. | |
| 7,900,042 B2 | 3/2011 | Hall et al. | |
| 8,015,211 B2 | 9/2011 | Marceau et al. | |
| 8,107,397 B1 | 1/2012 | Bagchi et al. | |
| 8,245,033 B1 | 8/2012 | Shetty et al. | |
| 8,467,527 B2 | 6/2013 | Long et al. | |
| RE45,254 E | 11/2014 | Roskind | |
| 8,903,084 B2 | 12/2014 | Long et al. | |
| 9,176,838 B2 | 11/2015 | Li et al. | |
| 2003/0018891 A1* | 1/2003 | Hall | H04L 63/0428 713/153 |
| 2003/0131245 A1 | 7/2003 | Linderman | |
| 2003/0191963 A1* | 10/2003 | Balissat | H04L 63/0209 726/12 |
| 2003/0200463 A1 | 10/2003 | McCabe | |
| 2004/0193876 A1* | 9/2004 | Donley | H04L 1/1607 713/162 |
| 2004/0202317 A1 | 10/2004 | Demjanenko et al. | |
| 2004/0210663 A1* | 10/2004 | Phillips | H04L 67/1008 709/230 |
| 2005/0025091 A1 | 2/2005 | Patel et al. | |
| 2005/0100161 A1 | 5/2005 | Husemann et al. | |
| 2005/0154873 A1 | 7/2005 | Cam-Winget et al. | |
| 2005/0198531 A1 | 9/2005 | Kaniz et al. | |
| 2006/0095969 A1* | 5/2006 | Portolani | H04L 63/0254 726/23 |
| 2007/0079368 A1 | 4/2007 | Takeyoshi et al. | |
| 2007/0118896 A1 | 5/2007 | Soejima et al. | |
| 2007/0180227 A1 | 8/2007 | Akimoto | |
| 2007/0240212 A1* | 10/2007 | Matalytski | G06F 21/83 726/22 |
| 2007/0245147 A1 | 10/2007 | Okeya | |
| 2007/0277231 A1 | 11/2007 | Medvinsky et al. | |
| 2008/0046714 A1* | 2/2008 | Suganthi | H04L 63/0428 713/150 |
| 2008/0184358 A1* | 7/2008 | Stamos | H04L 63/04 726/11 |
| 2008/0192928 A1 | 8/2008 | Yu et al. | |
| 2008/0192930 A1 | 8/2008 | Balissat et al. | |
| 2008/0219445 A1 | 9/2008 | Yato et al. | |
| 2008/0244268 A1 | 10/2008 | Durham et al. | |
| 2008/0260163 A1 | 10/2008 | Yushiya | |
| 2008/0320297 A1* | 12/2008 | Sabo | H04L 63/06 713/152 |
| 2009/0013374 A1 | 1/2009 | Tsai | |
| 2009/0119510 A1 | 5/2009 | Long et al. | |
| 2009/0210699 A1 | 8/2009 | Grewal et al. | |
| 2009/0214026 A1 | 8/2009 | Gueron et al. | |
| 2009/0220080 A1* | 9/2009 | Herne | H04L 63/0428 380/255 |
| 2010/0135498 A1 | 6/2010 | Long et al. | |
| 2010/0211790 A1 | 8/2010 | Zhang | |
| 2010/0281539 A1 | 11/2010 | Burns et al. | |
| 2011/0055585 A1 | 3/2011 | Lee | |
| 2011/0099623 A1* | 4/2011 | Garrard | H04L 63/126 726/14 |
| 2012/0016977 A1 | 1/2012 | Robertson et al. | |
| 2012/0042164 A1 | 2/2012 | Gagnon et al. | |
| 2012/0096270 A1 | 4/2012 | Long et al. | |
| 2012/0182884 A1 | 7/2012 | Pyatkovksiy et al. | |
| 2012/0250866 A1* | 10/2012 | Matsuo | H04L 9/0841 380/279 |
| 2013/0067556 A1 | 3/2013 | Minear et al. | |
| 2013/0097692 A1* | 4/2013 | Cooper | G06F 21/00 726/14 |
| 2014/0032905 A1 | 1/2014 | Long et al. | |
| 2014/0115702 A1 | 4/2014 | Li et al. | |

FOREIGN PATENT DOCUMENTS

| | | |
|---|---|---|
| CN | 101335621 | 12/2008 |
| CN | 101783791 A | 7/2010 |
| CN | 101795271 A | 8/2010 |
| CN | 101980500 A | 2/2011 |
| EP | 1699204 | 9/2006 |
| GB | 2447552 | 9/2008 |
| JP | 8-204702 | 8/1996 |
| JP | 2007-526718 | 9/2007 |
| JP | 2007-288514 | 11/2007 |
| JP | 2008-532398 | 8/2008 |
| JP | 2008/219454 | 9/2008 |
| JP | 2009-506617 | 2/2009 |
| WO | WO 01/63879 A1 | 8/2001 |
| WO | WO 0163879 A1 * | 8/2001 ......... H04L 63/0245 |
| WO | WO 2007/023465 A1 | 3/2007 |
| WO | WO 2007/108651 | 9/2007 |
| WO | WO 2014/063050 A1 | 4/2014 |

OTHER PUBLICATIONS

Supplementary European Search Report in EP Application No. 13 84 8035, dated May 31, 2016, 16 pages.
USPTO Jan. 31, 2014 Nonfinal Rejection in U.S. Appl. No. 13/656,406, 25 pages.
International Search Report and Written Opinion in International Application No. PCT/US2013/065680, dated Jan. 28, 2014, 11 pages.
USPTO May 26, 2011 Nonfinal Rejection in U.S. Appl. No. 12/327,137, 12 pages.
Ashwood, J., "AES Based Key Derivation Function," p. 1—XP007918326, posted on the internet Feb. 19, 2008, webpage available at: http://www.derkeiler.com/pdf/Newsgroups/sci.crypt/2008-02/msg00681.pdf.
Huang et al., "The FPGA Implementation of 128-bits AES Algorithm Based on Four 32-bits Parallel Operation," IEEE, The First International Symposium on Data, Privacy, and E-Commerce, Piscatawny, NJ, USA, Nov. 1, 2007, pp. 462-464.
Choi, et al., "Low-Power AES Design Using Parallel Architecture," IEEE International Conference on Convergence and Hybrid Information Technology, Piscatawny, NJ, USA, Aug. 28, 2008, pp. 413-416.

(56) References Cited

OTHER PUBLICATIONS

European Search Report for Application No. 09252688.8-2415/2194671, dated May 3, 2011, 4 pages.
USPTO Nov. 3, 2011 Final Rejection in U.S. Appl. No. 12/327,137, 11 pages.
Office Action Received for Japanese Patent Application No. 2009-271249, dated May 7, 2012, 3 pages of Office Action and 3 pages of English Translation.
USPTO Jul. 20, 2012 Nonfinal Rejection in U.S. Appl. No. 12/327,137, 9 pages.
Office Action received for Chinese Patent Application No. 200910259050.0, dated Jun. 26, 2012, 23 pages.
USPTO Feb. 22, 2013 Notice of Allowance in U.S. Appl. No. 12/327,137, 5 pages.
Chinese Office Action Received for Chinese Patent Application No. 200910259050.0 dated Jan. 30, 2013, 18 pages of Office Action including 13 pages of English translation.
Viega, et al., "The Use of Galois/Counter Mode (GCM) in IPsec Encapsulating Security Payload (ESP)", RFC 4106, Jun. 2005, pp. 1-11.
"McAfee Network Security Platform 7.0", IPS Administration Guide Revision B, Copyright 2012, McAfee, 431 pages.
"McAfee® Firewall Enterprise (Sidewinder®)", McAfee® Firewall Enterprise software version 7.0.1.02, Mar. 2009, 744 pages.
"Schannel", COM and Security Packages, retrieved on Oct. 18, 2012, 6 pages. available at: http://msdn.microsoft.com/en-us/library/windows/desktop/ms678421(v=vs.85).aspx.
"SSL—OpenSSL SSL/TLS library", Cryptography and SSL/TLS Toolkit, retrieved Oct. 18, 2012, 15 pages. available at: http://www.openssl.org/docs/ssl/ssl.html#API_FUNCTIONS.
Extended European Search Report for European Patent Application No. 08253608.7, dated Jun. 11, 2012, 6 pages.
Office Action received for European Patent Application No. 09252688.8, dated May 10, 2011, 8 pages.
Advisory Action received for U.S. Appl. No. 11/935,783, dated Dec. 9, 2011, 3 pages.
Final Rejection issued for U.S. Appl. No. 11/935,783 dated Oct. 15, 2012, 12 pages.
Final Rejection issued for U.S. Appl. No. 11/935,783 dated Sep. 7, 2011, 13 pages.
Non Final Rejection issued for U.S. Appl. No. 11/935,783 dated Mar. 27, 2012, 13 pages.
Non Final Rejection issued for U.S. Appl. No. 11/935,783 dated Dec. 28, 2010, 14 pages.
Restriction Requirement issued for U.S. Appl. No. 11/935,783, dated Sep. 28, 2010, 6 pages.
McGrew, D., et al. "The Galois/Counter Mode of Operation (GCM)", May 31, 2005, 44 pages.
McGrew, D. et al., "The Use of Galois Message Authentication Code (GMAC) in IPsec ESP and AH", RFC 4543, May 2006.
Dworkin, Morris, "Recommendation for Block Cipher Modes of Operation: Galois/Counter Mode (GCM) for Confidentiality and Authentication," NIST Special Publication 800-38D DRAFT, Apr. 2006, 23 pages.
Black, J., "Authenticated Encryption" in Encyclopedia of Cryptography and Security, section A, pp. 10-21, Authenticated encryption. Springer, 2005, retrieved from http://www.cs.colorado.edu/~jrblack/papers/ae.pef.
Notice of Granting Patent Right for Invention for CN Application No. 200810170453.3, dated Feb. 24, 2012, 4 pages.
Office Action for CN Application No. 200810170453.3, dated Nov. 9, 2010, 4 pages.
Office Action for CN Application No. 200810170453.3, dated May 18, 2011, 3 pages.
Office Action for CN Application No. 200810170453.3, dated Sep. 27, 2011, 3 pages.
Office Action for JP Application No. 2008-284424, dated Jul. 22, 2011, 6 pages.
Non Final Rejection issued for U.S. Appl. No. 13/337,919, dated Sep. 21, 2012, 13 pages.
Final Rejection issued for U.S. Appl. No. 13/337,919, dated May 10, 2013, 16 pages.
Office Action for JP Application No. 2008-284424, dated Nov. 29, 2011, 7 pages.
Notice of Allowance Received for Japanese Patent Application No. 2009-271249, dated Sep. 24, 2012, 6 pages of Notice of Allowance and 3 pages of English Translation.
Dierks et al., "The TLS Protocol Version 1.0" Network Working Group. The Internet Society. Jan. 1999, 75 pages.
Dierks et al., "The Transport Layer Security (TLS) Protocol Version 1.2" Network Working Group. The IETF Trust. Aug. 2008, 98 pages. Retrieved on Oct. 26, 2012 at: http://www.ietf.org/rfc/rfc5246.txt10/26/2012.
Freier et al. "The Secure Sockets Layer (SSL) Protocol Version 3.0." Internet Engineering Task Force. Aug. 2011, Retrieved on Oct. 26, 2012 at: http://tools.ietf.org/html/rfc6101, 67 pages.
Grewal et al. "Wrapped Encapsulating Security Payload (ESP) for Traffic Visibility." Internet Engineering Task Force. Apr. 2010, Retrieved on Oct. 26, 2012 at: http://tools.ietf.org/html/rfc5840, 15 pages.
IEEE Standard for Local and Metropolitan Area Networks: Media Access Control (MAC) Security, IEEE Std 802. 1AE-2006, Aug. 18, 2006, 154 pages.
Lee, Thomas. "Authentication Functions." Microsoft 2012, Retrieved on Oct. 26, 2012 at: http://msdn.microsoft.com/en-us/library/windows/desktop/aa374731 (v=vs.85).aspx, 25 pages.
Non-Final Office Action received for U.S. Appl. No. 13/916,027, dated Mar. 28, 2014, 9 pages.
Office Action received for Chinese Patent Application No. 201210144490.3, dated Sep. 27, 2013, 4 pages of English Translation and 5 pages of Chinese Office Action.
Office Action received for Chinese Patent Application No. 201210144490.3, dated May 16, 2014, 4 pages of English Translation and 3 pages of Chinese Office Action.
Notice of Allowance received for U.S. Appl. No. 13/916,027, dated Aug. 4, 2014, 7 pages.
USPTO Jan. 20, 2015 Nonfinal Rejection in U.S. Appl. No. 13/656,406, 26 pages.
International Preliminary Report on Patentability in International Application No. PCT/US2013/065680, dated Apr. 21, 2015, 7 pages.
USPTO Jun. 19, 2015 Notice of Allowance in U.S. Appl. No. 13/656,406, 10 pages.
Office Action received for Korean Patent Application No. 2015-7006915, dated Dec. 3, 2015, English Translation, 5 pages.
Notice of Reasons for Rejection in JP Application No. 2015-531353, dated May 10, 2016, with English translation, 5 pages.
Baba, Tatsuya, Mastering IPsec, O'Reilly Japan, Inc. Aug. 18, 2006 vol. 2, pp. 157-162, English translation, 7 pages.
Second Office Action received for Chinese Patent Application No. 201380048778.3, dated Feb. 14, 2017, with English translation, 8 pages.
Notice of Granting Patent Right for Inventor from PRC State Intellectual Property Office for Chinese Patent Application No. 201380048778.3, dated Jun. 2, 2017, with English translation; 3 pages.

\* cited by examiner

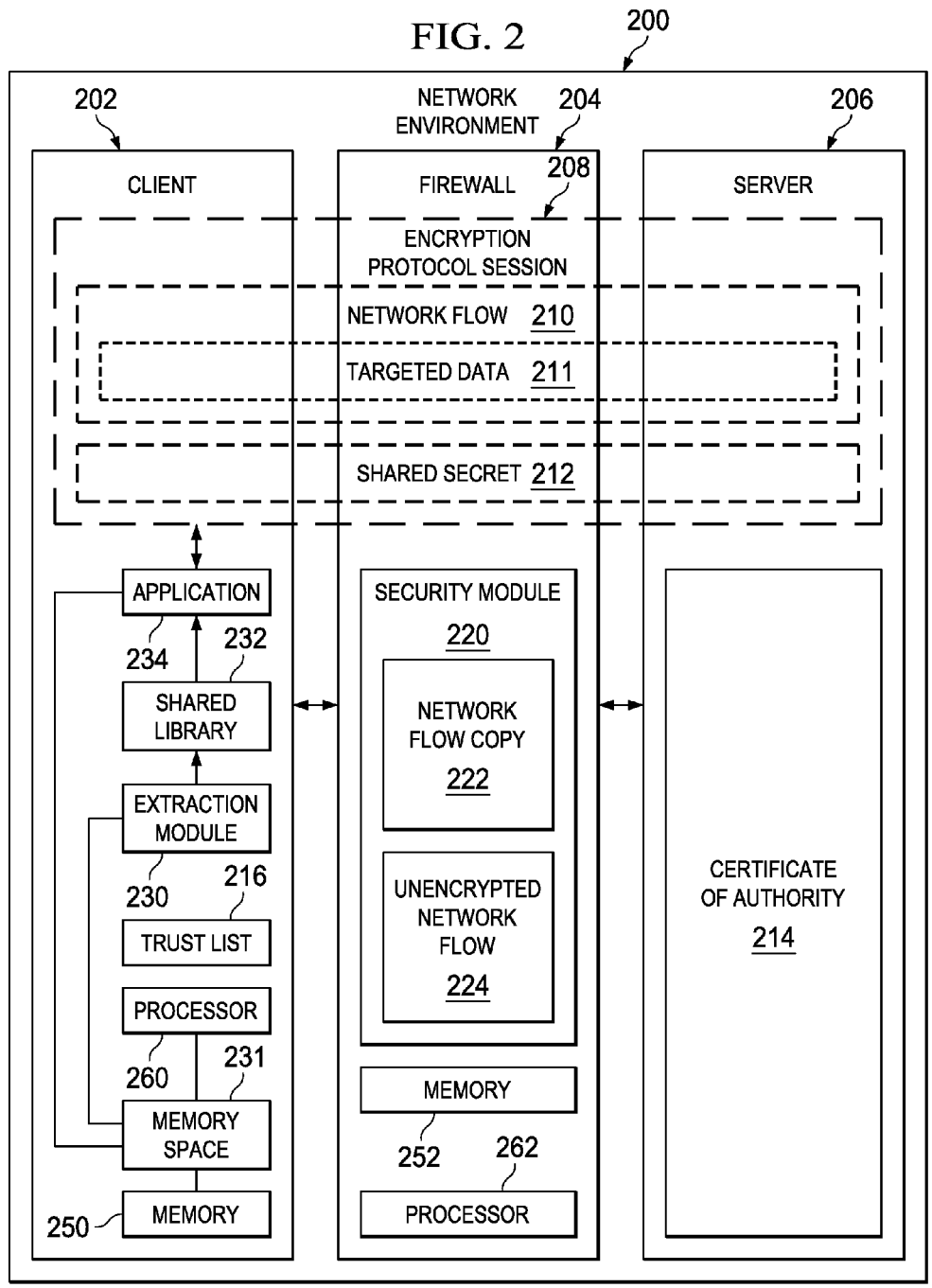

ENCRYPTED DATA INSPECTION IN A NETWORK ENVIRONMENT

RELATED APPLICATION

This Application is a continuation (and claims the benefit under 35 U.S.C. § 120) of U.S. application Ser. No. 13/656,406, filed Oct. 19, 2012, entitled "ENCRYPTED DATA INSPECTION IN A NETWORK ENVIRONMENT," Inventors Xiaoning Li, et al. The disclosure of the prior application is considered part of (and is incorporated in its entirety by reference in) the disclosure of this application.

TECHNICAL FIELD

This disclosure relates in general to the field of network security and, more particularly, to inspecting encrypted data in a network environment.

BACKGROUND

The field of network security has become increasingly important in today's society. The Internet has enabled interconnection of different computer networks all over the world. However, the Internet has also presented many opportunities for malicious operators to exploit these networks. Certain types of malicious software (e.g., bots) can be configured to receive commands from a remote operator once the software has infected a host computer. The software can be instructed to perform any number of malicious actions, such as sending out spam or malicious emails from the host computer, stealing sensitive information from a business or individual associated with the host computer, propagating to other host computers, and/or assisting with distributed denial of service attacks. In addition, the malicious operator can sell or otherwise give access to other malicious operators, thereby escalating the exploitation of the host computers. Thus, the ability to effectively protect and maintain stable computers and systems continues to present significant challenges for component manufacturers, system designers, and network operators.

Enterprise environments deploy numerous network management tools, including firewalls, network intrusion detection/prevention (NIDS/NIPS) systems, traffic shapers, and other systems. A number of these systems rely on inspection of network traffic in order to provide a wide array of services, including the detection/prevention of malware propagation, ensuring corporate intellectual property is not leaked outside well defined enterprise boundaries, as well as general auditing and network management functions. Network traffic may also be encrypted using protocols such as Secure Sockets Layer (SSL)/Transport Layer Security (TLS).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is an example illustration of a network environment 200 in accordance with an embodiment;

DETAILED DESCRIPTION OF EXAMPLE EMBODIMENTS

Example Embodiments

Figure 1:
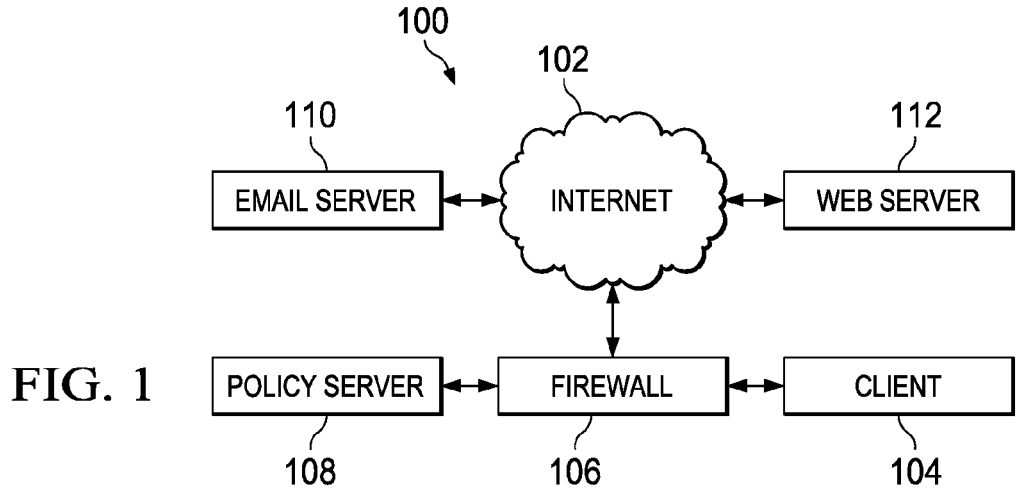
FIG. 1 is a simplified block diagram of a network environment in which a firewall may intercept a network flow in accordance with an embodiment.

Turning to FIG. 1, FIG. 1 is a simplified block diagram of a network environment in which a firewall may intercept a network flow in accordance with an embodiment. In the embodiment illustrated in FIG. 1, network environment 100 can include Internet 102, client 104, a firewall 106, a policy server 108, a mail server 110, and a web server 112. In general, client 104 may be any type of termination node in a network connection, including but not limited to a desktop computer, a server, a laptop, a mobile device, a mobile telephone, or any other type of device that can receive or establish a connection with another node, such as mail server 110 or web server 112. Firewall 106 may control communications between client 104 and other nodes attached to Internet 102 or another network, such as by blocking unauthorized access while permitting authorized communications. In some instances, firewall 106 may be coupled to or integrated with an intrusion prevention system, network access control device, web gateway, email gateway, mobile device, or any other type of gateway between Internet 102 and client 104. Moreover, the location of firewall 106 in the routing topology close to user client 104 is arbitrary.

Policy server 108 may be coupled to or integrated with firewall 106, and may be used to manage client 104 and to administer and distribute network policies. Thus, in this example embodiment, client 104 may communicate with servers attached to Internet 102, such as mail server 110 or web server 112, by establishing a connection through firewall 106 if permitted by policies implemented in firewall 106 and managed by policy server 108.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. Network environment 100 may include a configuration capable of transmission control protocol/Internet protocol (TCP/IP) communications for the transmission or reception of packets in a network. Network environment 100 may also operate in conjunction with a user datagram protocol/IP (UDP/IP) or any other suitable protocol where appropriate and based on particular needs.

For purposes of illustrating the techniques for providing network security in example embodiments, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks using the Internet, for example, to access web pages hosted on servers connected to the Internet, to send or receive electronic mail (i.e., email) messages, or to exchange files. However, malicious users continue to develop new tactics for using the Internet to spread malware and to gain access to confidential information. Malware generally includes any software designed to access and/or control a computer without the informed consent of the computer owner, and is most commonly used as a label for any hostile, intrusive, or annoying software such as a computer virus, bot, spyware, adware, etc. Once compromised, malware may subvert a host and use it for malicious activity, such as spamming or information theft. Malware also typically includes one or more propagation vectors that enable it to spread within an organization's network or across other networks to other organizations or individuals. Common propagation vectors include exploiting known vulnerabilities on hosts within the local network and sending emails having a malicious program attached or providing malicious links within the emails.

For purposes of illustrating some example techniques of a security module and an extraction module, it is important to understand a man-in-the-middle (MITM) technique. One or more embodiments recognize and take into account that some embodiments for screening SSL (or TLS) traffic in security devices use MITM techniques: the security device terminates the SSL connection using a certificate that spoofs the destination, then proxies the data to the destination over a second SSL connection. The user can see this spoofing, and either ignores it explicitly for each connection, or sets his machine to trust the security device so the warning goes away.

MITM is expensive for the security device to implement, because it needs to decrypt and re-encrypt all traffic. Also, MITM requires the security device to perform expensive public-key cryptography operations on each connection being screened.

An additional problem with MITM is that the user does not get a true SSL authentication of the target web site (server). This is a key benefit of SSL security, but the user only knows that the security device is reached, and not the web site that has really been accessed. This deficiency can be exploited by attackers who using phishing emails to direct users to sites that look like trusted sites, but are really out to exploit them.

Additionally, the different embodiments of this disclosure recognize and take into account a situation where a trusted client is communicating with an untrusted server; the network device terminates and re-establishes an SSL/TLS session between two communicating endpoints. This is also often referred to as a break-make connection. The trusted client is provisioned with a certificate of the network device/ domain and accepts this in the secure session setup process, even though it is communicating with an endpoint beyond the network appliance (e.g. a banking website). In practice, this session is terminated at the network appliance, which instantiates a second, separate session to the ultimate endpoint, on behalf of the client. This mechanism allows the network appliance to get visibility to the TLS traffic, as it is a 'man-in-the-middle' for the secure communication channel. This approach results in a burden on the network appliance, as it needs to proxy connections for every client/session, hence needs to manage resources for all of these proxy connections. This situation adds significant overhead to the network appliance.

Also, the different embodiments of this disclosure recognize and take into account another situation where an untrusted client is communicating with a trusted server, the network appliance gets access (in some OOB manner) to the trusted server's certificate, including the public/private key pair (e.g. RSA keys) used for authenticating the SSL/TLS session. Because of the SSL/TLS operation, where the client sends a pre-master secret to the server, encrypted with the public key of the server, the network appliance is able to capture/decrypt this information en route and snoop on the SSL/TLS handshake. This allows the network appliance to independently compute the SSL/TLS session keys and thereafter decrypt the encrypted communication between the two endpoints. However, this situation relies upon ownership of the server private key, and does not apply in the common situation of an organization that seeks to protect multiple users with client machines that are connecting to multiple servers on the Internet, by provisioning a security device, such as Intrusion Protection or Firewall.

The different embodiments of this disclosure recognize and take into account: enterprises have pressing need to scan SSL/TLS traffic; malware inspection; data loss protection; MITM techniques already in use; MITM fakes both authentication and encryption; user sees forged certificate, trust is compromised; annoyance factor when a user either sees a warning message for every connection, or never knows whether trust is real.

One or more embodiments of this disclosure provide a novel approach which simplifies visibility into encrypted network streams, as well as alleviating large overheads on the network devices.

FIG. 2 is an example illustration of a network environment 200 in accordance with an embodiment. In an aspect of this disclosure, network environment 200 is includes a client 202, a firewall 204, and a server 206. Network environment 200 may be one example of network environment 100 as shown in FIG. 1. In an embodiment, network environment 200 may include an encryption protocol session 208 that operates between client 202, firewall 204, and server 206. Encryption protocol session 208 may further include network flow 210, targeted data 211, and shared secret 212. Server 206 may further include certificate of authority 214. Firewall 204 may further include security module 220, which in turn may include a network flow copy 222 and an unencrypted network flow 224. Client 202 may further include trust list 216, extraction module 230, shared library 232, and application 234.

In an embodiment of this disclosure, server 206 includes certificate of authority 214. Certificate of authority 214 may be an entity that issues digital certificates. The digital certificate certifies the ownership of a public key by the named subject of the certificate. This allows client 202 to rely upon signatures or assertions made by the private key that corresponds to the public key that is certified. In this model of trust relationships, certificate of authority 214 is a trusted third party that is trusted by both server 206 and client 202 upon the certificate. On client 202, trust list 216 may be maintained. Trust list 216 may include the digital certificates that client 202 trusts.

In one or more embodiments, encryption protocol session 208 operates between client 202, firewall 204, and server 206. Encryption protocol session 208 includes a network flow 210. Network flow 210 is an encrypted flow of data that operates in both directions between client 202 and server 206. Firewall 204 may intercept network flow 210 for inspection and analysis. In an embodiment, the protocols used for encryption protocol session 208 (secure communications) may be transport layer security (TLS) or its predecessor, secure sockets layer (SSL). These protocols are cryptographic protocols that provide communication security over the Internet. These protocols may also be used interchangeably in this disclosure. TLS and SSL encrypt the segments of network connections at the application layer for the transport layer, using asymmetric cryptography for key exchange, symmetric cryptography for confidentiality, and message authentication codes for message integrity.

Client 202 and server 206 may also maintain a shared secret 212 (e.g., a password, key, etc.) for authentication of data in network flow 210. Shared secret 212 may be configured during encryption protocol session 208. Shared secret 212 may be a value that is shared, and known, between client 202 and server 206. In an embodiment, for example, shared secret 212 may be a master secret or session keys as used in SSL/TLS. Session keys may be a session context and may include an initialization vector, crypto algorithm being used, etc., as well as just the session key. A session context may contain necessary cryptographic information to de-capsulate the payload (e.g. encryption/integrity/compression algorithms, associated keys, key sizes, Initialization vectors, etc.) In contrast, a public/private asymmetric key structure is not shared between client 202 and server 206 because each party has different keys.

Extraction module 230 is configured to extract shared secret 212 from client 202. In particular, extraction module 230 may extract the master secret, pre-master secret, hash-based message authentication code (HMAC), and/or session keys. Extraction module 230 may be loaded onto client 202, or in other embodiments, may be a separate module with access to client 202.

In an embodiment, extraction module 230 may load shared library 232 into application 234. This allows extraction module 230 access to encryption protocol session 208 through application 234 to identify shared secret 212. Shared library 232 may be a shared library or shared object is a file that is intended to be shared by executable files and further shared objects files. Shared library 232 may be, for example, a dynamic link library (DLL). Application 234 may be a process that is communicating with server 206 through encryption protocol session 208. Application 234 may be, for example, a web browser.

In another embodiment, extraction module 230 may be configured to monitor network flow 210 at a network layer and detect the progress of a network handshake, such as the SSL initial handshake, and so determine the point in time when memory space 231 of application 234 may contain the shared secret 212 for the encrypted connection being negotiated. Extraction module 230 may be configured to open the memory space 231 of the process running the application 234, for example, by using debugging system calls to access the process memory of a target process on the same computer system in Microsoft®, Windows®, or Linux®. Extraction module 230 may also be configured to search memory space 231 to identify shared secret 212.

Extraction module 230 is configured to send shared secret 212 to security module 220. The path of transmission to security module 220 may also be a secured channel.

With shared secret 212, security module 220 may be able to decrypt network flow 210 using the same encryption/decryption process as client 202 and server 206 are using. Security module 220 may operate in different modes of operation.

In one embodiment, security module 220 may be configured to copy network flow 210 to create network flow copy 222. Network flow copy 222 may then be decrypted without affected network flow 210 to create unencrypted network flow 224. In some embodiments, security module 220 may delay network flow 210 to wait for shared secret 212 from encryption module 230, have time to decrypt network flow copy 222, modify network flow 210, inspect unencrypted network flow 224 for security issues, or any other suitable reason for delaying. In other embodiments, security module 220 does not delay network flow 210 and may only copy network flow 210.

In an embodiment, security module 220 may be configured to scan network flow 210 and/or network flow copy 222 (once decrypted and as unencrypted network flow 224) for targeted data 211. Targeted data 211 may contain data that security module 220 is looking for such as, for example, hostile, intrusive, or annoying software such as a computer virus, bot, spyware, adware. Targeted data 211 may be malware.

In operational terminology, and in one particular embodiment, an illustration of a TLS or SSL connection may begin as follows: during a negotiation phase client 202 sends a message specifying the highest TLS protocol version it supports, a random number, a list of suggested cipher suites, and suggested compression methods. A cipher suite is a named combination of authentication, encryption, and message authentication code (MAC) algorithms used to negotiate the security settings for a network connection using the TLS or SSL network protocols. Also, if client 202 is attempting to perform a resumed handshake, it may send a session ID.

In response, server 206 responds with a message containing the chosen protocol version, another random number, a selected cipher suite, and a selected compression method from the choices offered by the client. To confirm or allow resumed session, server 206 may send the same session ID. To start a new session, server 206 may send a new session ID. Also, client 202 may respond with another message, which may contain a pre master secret, public key, or nothing. The pre master secret is encrypted using the public key of the server certificate. Client 202 and server 206 then use the random numbers and the pre master secret to compute a common secret, called the "master secret". All other key data for this connection is derived from this master secret. The master secret may be used to make session keys for each communication session between client 202 and server 206. The pre master secret, master secret, and session keys are all examples of shared secret 212.

One or more embodiments provide extraction module 230, also referred to as a trusted agent, on client 202 that monitors SSL/TLS connections and is able to intercept certain, well defined, application programming interfaces (APIs) to directly extract the master secret, pre-master secret, and/or the session key. Extraction module 230 on client 202 may perform the extraction of shared secret 212. This information is securely shared to security module 220, a trusted and authorized network appliance, via a secure out-of-band (OOB) channel. In other embodiments, the information is shared via a non-secure channel. This allows security module 220 to decrypt encryption protocol session 208, SSL/TLS communication, and get visibility into network flow 210.

In operational terminology, and in particular, one embodiment, extraction module 208, special software, on client 202, the user workstation, searches out shared secret 212, the SSL key, as each encryption protocol session 208 is established. Discovery protocols then transmit shared secret 212 securely to security module 220. Client 202 establishes the SSL connection end-to-end, with full authentication of the target site, but security module 220 can still scan the connection to protect client 202.

In addition, shared secret 212 may shared with security module 230 only after a public-key handshake occurs, so security module 230 can decrypt the session using a single symmetric decryption per data item. This process is faster than MITM.

One or more embodiments of this disclosure (1) preserves end-to-end authentication and that it can be used for passive connections to the network, (2) alleviate overhead on a security module to store state for every single connection, where a second, independent SSL/TLS connection must be constructed in order to get visibility into the encrypted traffic streams, and (3) are compatible with the user of client-side certificates in SSL (not supported in MITM).

The embodiments of this disclosure provide a client based approach to extract the SSL/TLS master secret and/or session keys and sharing these with authorized security modules using a separate secure channel. The embodiments also enable scanning of the network flow without removing the ability of the client to perform end-to-end authentication and in a way that is very efficient for the security devices (IPS, Firewall, security module) to implement.

The embodiments of this disclosure provide a system to decrypt encryption protocol sessions (SSL/TLS sessions) without compromising client trust. The embodiments provide: SSL Handshake is passed on without change; original certificate, original CA trust; extraction module shares session key with security module; key is a short-lived credential, affects only this session; decryption can also be faster than MITM; decryption can also support SSL mutual authentication client-side and server authentication; and can support passive mode inspection of traffic.

The embodiments also provide: the security device can also be used in a proxy environment, where proxy may need to modify the SSL plaintext; authentication and trust are still end-to-end; connection starts in "inspection mode", where all data is pass-through; If proxy needs to change plaintext (e.g., modifying a URL, removing an attachment), connection switches to "proxy mode". In one or more of the embodiments, a crypto state is divided between host and server. The client decrypt state is copied to become the initial server encrypt state. The server decrypt state is copied to become the initial client encrypt state. The security device both decrypts and re-encrypts SSL data, using the separate states. SSL plaintext can be modified in between these steps. The crypto states within the proxy diverge between received state and re-encrypt state once the proxy modifies plaintext. Once re-encryption starts, it continues until the connection terminates.

The security module may use SSL key information to decrypt/verify SSL session information and inspect SSL packets in further for malware detection or data loss protection.

One or more embodiments of this disclosure provide for modifying the SSL/TLS handshake in order to change the SSL parameters that can be negotiated. In such embodiments, the Initialization Vector (IV) must also be derived to allow the modification of the SSL/TLS FINISH handshake message. This may be accomplished by using the master secret as the shared secret. In another embodiment, the IV may directly be extracted by the extraction module and shared with the security module, in the same manner as sharing the SSL/TLS session key.

In an embodiment, a handshake may be rewritten as follows:
For the ServerHello/ClientHello by:
  A) Limiting the list of the cipher suites in the Hello to an approved list;
  B) Changing the list of cipher suites in the ClientHello to an approved list;
  C) Changing the selected cipher suite in the ServerHello to one in an approved list;
  D) Changing the random data from a client/server to a more secure source; and
  E) Not allowing session resumption by removing the session from the Client Hello.
For the ClientCertificate by:
  A) Supplying one or more Client Certificates;
  B) Replacing one or more Client Certificates; and
  C) Removing one or more Client Certificates.
For the ClientKeyExchange by changing the random data from a client/server to a more secure source.

In one example implementation, client 202 and/or firewall 204 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. However, user client 202 may be distinguished from other network elements, as they tend to serve as a terminal point for a network connection, in contrast to a gateway or router that tends to serve as an intermediate point in a network connection. Client 202 may also be representative of wireless network nodes, such as a smartphone, or other similar telecommunications devices.

In regards to the internal structure associated with network environment 200, each of client 202 and/or firewall 204 can include memory elements for storing information to be used in the operations outlined herein. Each of client 202 and/or firewall 204 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein (e.g., memory elements 250 and 252) should be construed as being encompassed within the broad term 'memory element.' The information being used, tracked, sent, or received by client 202 and/or firewall 204 could be provided in any database, register, queue, table, cache, control list, or other storage structure, all of which can be referenced at any suitable timeframe. Any such storage options may be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, client 202 and/or firewall 204 may include software modules (e.g., extraction module 230 and/or security module 220) to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of use client 202 and/or firewall 204 may include a processor 260 and 262 that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 3:
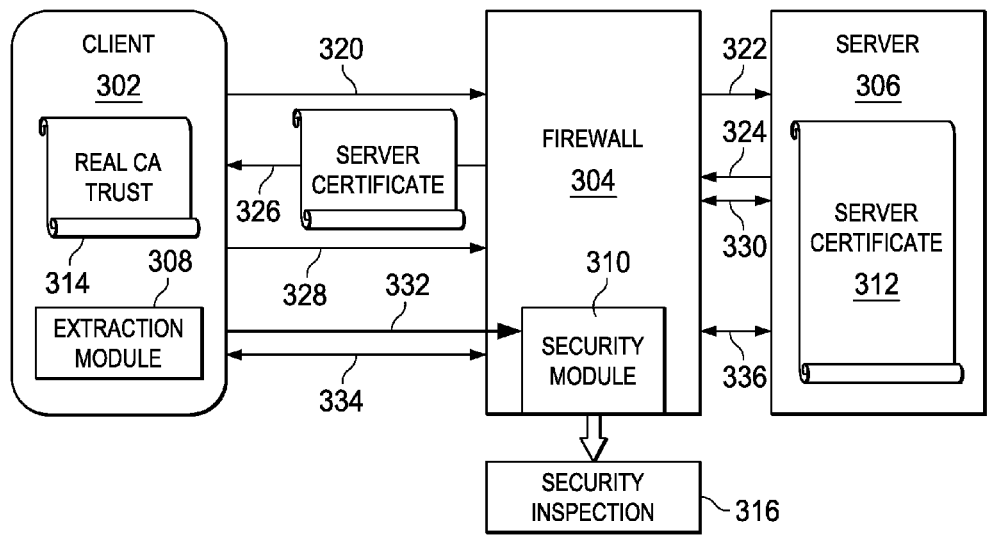
FIG. 3 is an illustration of a network environment with SSL/TLS handshake communications in accordance with an embodiment.

FIG. 3 is an illustration of a network environment with SSL/TLS handshake communications in accordance with an embodiment. Network environment 300 includes client 302, firewall 304, and server 306. Furthermore, client 202 includes extraction module 308, firewall 304 includes security module 310 to perform security inspection 316, and server 306 includes server certificate 312.

Server certificate 312 may be on example of certificate of authority 214 in FIG. 2. Server certificate 312 may be passed through to client 202. Client 202 may store server certificate 312 in real certificate authority trust 314. Real certificate authority trust 314 may be one example of trust list 216 in FIG. 2.

Network environment 300 also includes messages 320-336. Messages 320-336 may be messages included as part of a handshake for an SSL/TLS session. An SSL/TLS session may be one example of encryption protocol session 208 in FIG. 2.

Messages 320 and 322 may be initial messages that include a ClientHello and a ServerHello. Firewall 304 may allow message 320 to pass through. Even though message 320 and 322 are labeled separately, they contain the same information.

Messages 324 and 326 may be server 306 sending client 302, server certificate 312. Firewall 304 also passes through these messages. Even though message 324 and 326 are labeled separately, they contain the same information. By passing through server certificate 312, client 302 can confirm that communications are coming from server 306.

Messages 328 and 330 are the finishing messages for negotiation. Even though message 324 and 326 are labeled separately, they contain the same information. In other embodiments, if security module 310 wants to select the cipher suite, security module 310 may alter messages 328 and/or 330. In this case, they may not be the same.

Message 332 may be when extraction module 308 sends a shared secret to security module 310. Message 332 may also be a secure message.

Messages 334 and 336 may represent the network flow. These messages show the data that is passed through firewall 306. In one or more embodiments, firewall 306 allow these message to pass through, in other embodiments firewall 306 may go between messages 334 and 336. In the later situation, firewall 306 may delay, terminate, or modify messages 334 and 336.

Figure 4:
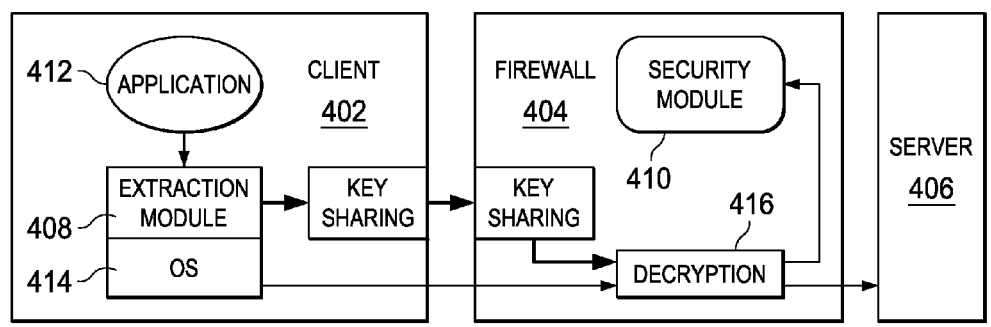
FIG. 4 is a block diagram of a network environment 400 for SSL/TLS in accordance with an advantageous embodiment.

FIG. 4 is a block diagram of a network environment 400 for SSL/TLS in accordance with an advantageous embodiment. Network environment 400 includes client 402, firewall 404, and server 406. Furthermore, client 202 includes extraction module 408 and firewall 304 includes security module 310. Client 402 may be one example of client 202 as shown in FIG. 2. Firewall 404 may be one example of firewall 204 as shown in FIG. 2. Server 406 may be one example of server 206 as shown in FIG. 2.

Client 202 further includes application 412 and operating system (OS) 414. Application 412 may be a process that initiates an encryption protocol session with server 406. Application 412 may be loaded into operating system 414 that handles the actual transmission of data to server 406.

Extraction module 408 may extract a shared secret from operating system 414 and/or application 412. Extraction module performs key sharing to send the shared secret (SSL session key or master secret) to security module 410. This allows security module to perform decryption 416 on the network flow between operating system 414 and server 406. The network flow may be SSL/TLS encrypted traffic.

Figure 5:
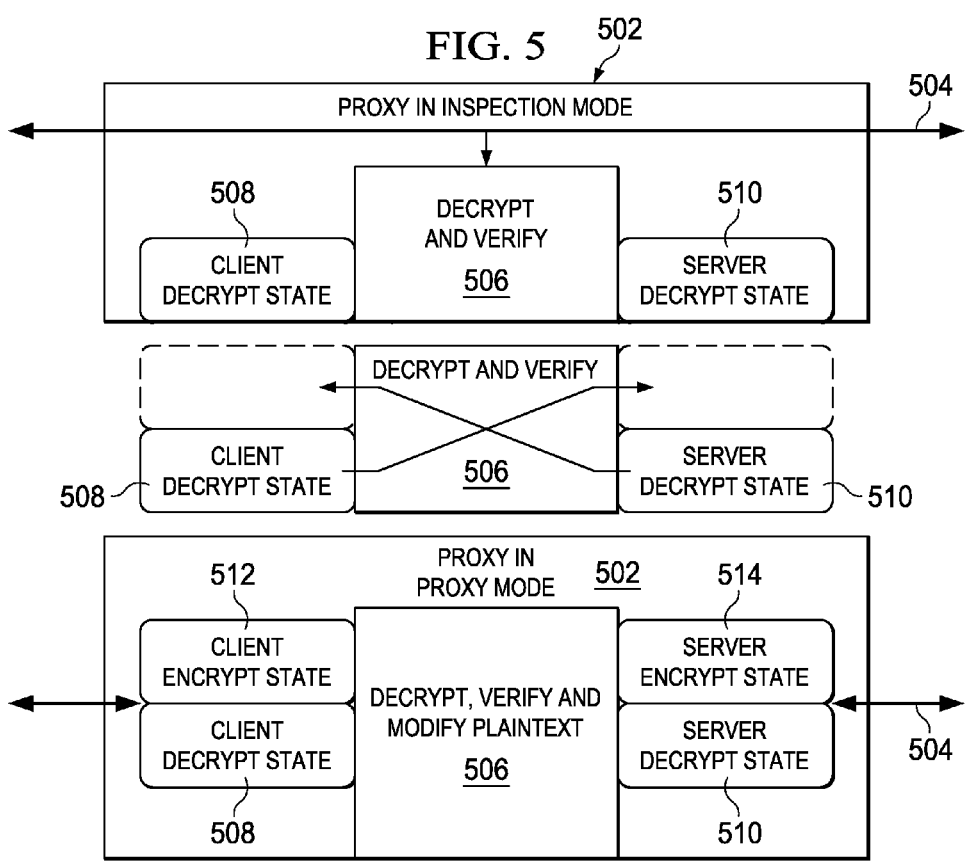
FIG. 5 is an illustration of a security module as a proxy in accordance with an illustrative embodiment.

FIG. 5 is an illustration of a security module as a proxy in accordance with an illustrative embodiment. A network environment 502 may include a network flow 504, a security module 506, a client decrypt state 508, a server decrypt state 510, a client encrypt state 512, and a server encrypt state 514.

Security module 506 in part (a) of FIG. 5 may be a proxy in inspection mode. When in inspection mode security module 506 is copying and decrypting network flow 504. Security module 506 uses client decrypt state 508 to decrypt network flow 504 coming from a client and server decrypt state 510 to decrypt network flow 504 coming from a server.

In part (b) of FIG. 5, security module 502 is transitioning into proxy mode. Security module 506 may take client decrypt state 508 to create server encrypt state 514 and take server decrypt state 510 to create client encrypt state 512. In addition to decrypting like in part (a) in inspection mode, security module 506 can also encrypt in proxy mode in part (c).

In part (c), security module 506 is in between network flow 504. During proxy mode, security module 506 may pass through, decrypt/encrypt, terminate, and/or modify network flow 504. To modify network flow 504, security module may decrypt as before in part (a), but then use client encrypt state 512 and/or server encrypt state 514 to also encrypt network flow 504. In an embodiment, once security module begins modifying network flow 504, security module 506 may encrypt/decrypt the rest of network flow 504 for the rest of the encryption protocol (SSL/TLS) session.

Figure 6:
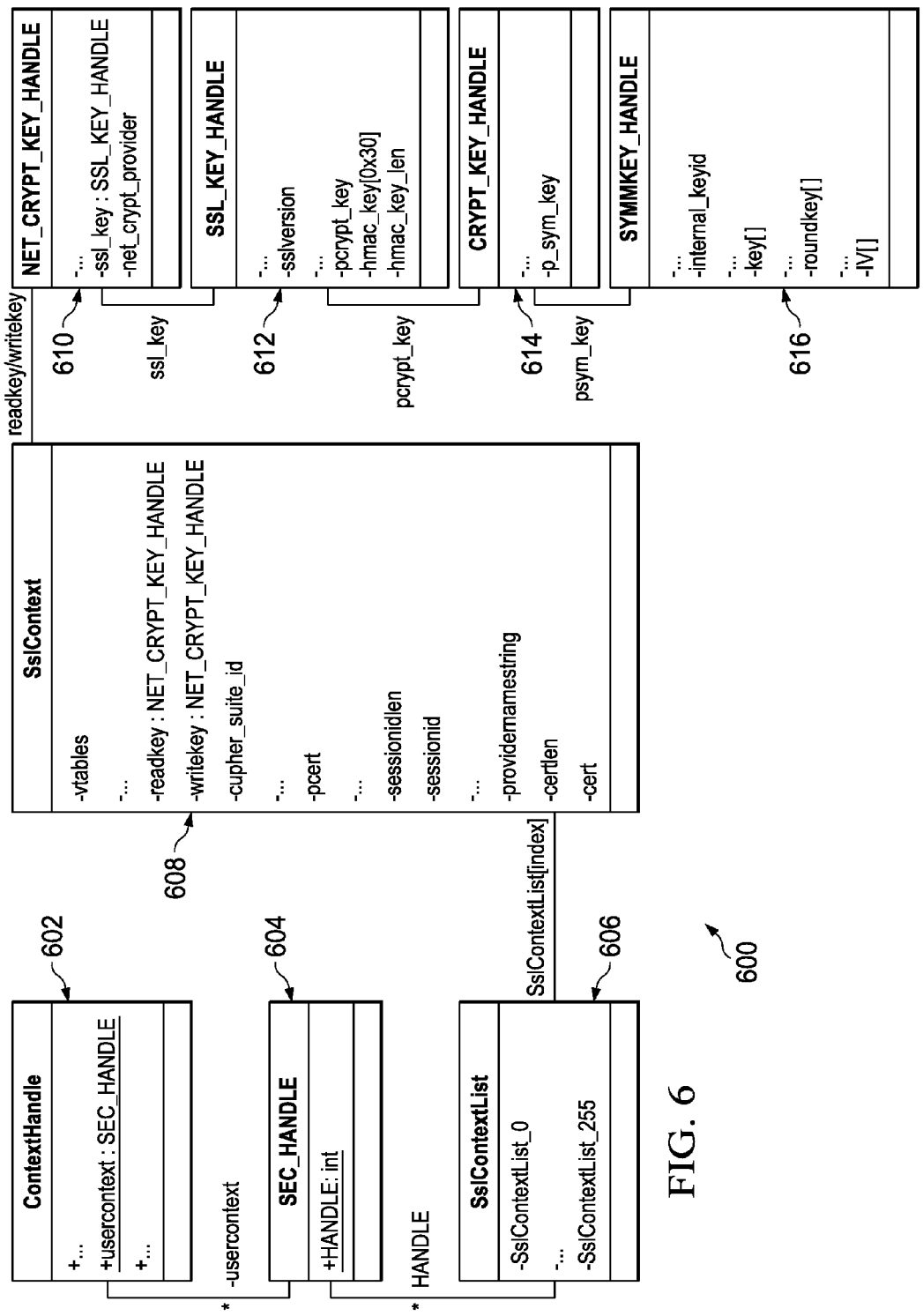
FIG. 6 is an illustration of a data diagram in accordance with an embodiment.

FIG. 6 is an illustration of a data diagram in accordance with an embodiment. Data diagram 600 shows a typical SSL/TLS data structures. Data diagram 600 includes data structures 602-616.

The extraction module may inspect a target application memory and address related data structures 602-616 with API hooks or signature based scanning. The client may be protected by other security services to protect sensitive SSL key information before it is sent to a security module via a secure OOB channel.

In an embodiment, a decrypt path might be Wininet.dll including CFSM:RunworkItem, CFSM:Run, CFSM:SecureReceive, ICSECURESOCKET::RECEIVE_FSM, ICSecuresocket::DecryptData, and ICSecuresocket::DecryptData. Then, Sspiceli.dll, which includes DecryptMessage and LsaunsealMessage. Then Schannel.dll, which includes SpunsealMessage, SslUnsealMessageStream, TlsDecryptHandler, and TlsDecryptMessag. Then, Ncrypt.dll, which includes SslDecryptpacket, SPSslDecryptPacket, and TlsDecryptPacket. Then, Bcrypt.dll, which includes BcryptDecrypt. Then, Bcryptprimitives.dll, which includes MSCryptDecrypt, MSBlockDecrypt, and AescbcDecrypt.

In an embodiment, a function may be a DecryptMessage( ) Function. This function may be used as follows:
SECURITY_STATUS SEC_Entry
DecryptMessage(_in PCtxtHandle phContext,_inout PSecBufferDesc pMessage,_in ULONG MessageSeqNo,_out PULONG pfQOP).
CtxtHandle may be additional context information
CtxtHandle may access LSA_SEC_HANDLE by CtxtHandle {Void*P_vtable; LSA_SEC_HANDLE usercontext; . . . }
With LSA_SEC_HANDLE, NCRYPT_KEY_HANDLE may be accessed. CSslContext includes Cipher ID, ReadKey, WriteKey, and SessionID.
With NCRYPT_KEY_HANDLE, BCRYPT_KEY_HANDLE may be accessed. SSL_KEY_HANDLE may include hmac_key and bcrypt_key handle.
With BCRYPT_KEY_HANDLE, the shared secret (session key) may be obtained.
MSCRYPT_SYMMKEY_HANDLE includes the session key and the round key.

Figure 7:
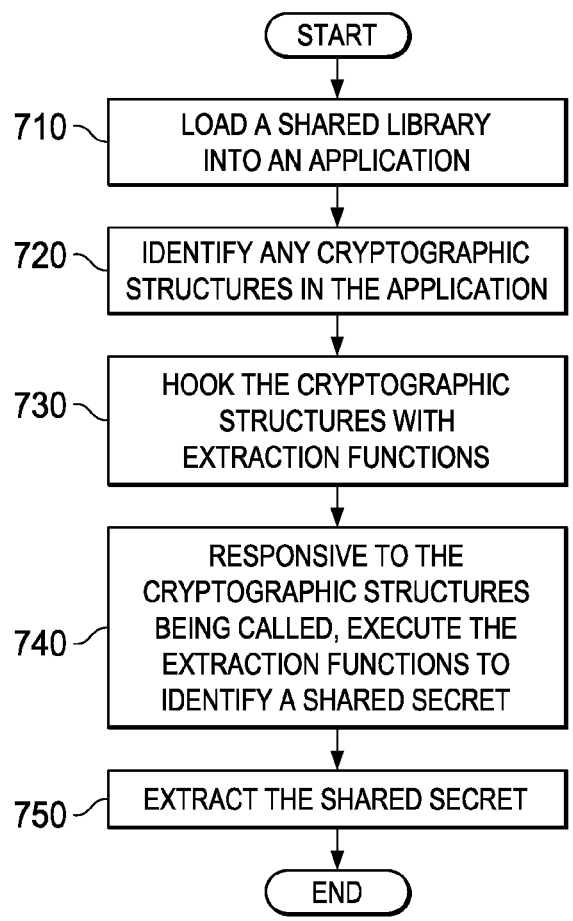
FIG. 7 is a simplified flowchart illustrating a process for extracting a shared secret using a shared library in accordance with an embodiment.

FIG. 7 is a simplified flowchart illustrating a process for extracting a shared secret using a shared library in accordance with an embodiment. A flow 700 may be a process that operates during and/or before an encryption protocol session. At 710, an extraction module loads the shared library into an application. At 720, the extraction module identifies any cryptographic structures in the application. At 730, the extraction module hooks the cryptographic structures with extraction functions. Responsive to the cryptographic structures being called, at 740, the execution module executes the extraction functions to identify the shared secret. At 750, the extraction module extracts the shared secret. After 750, the extraction module may securely transmit the shared secret to a security module.

In operational terms, and specifically one embodiment, an extraction module injects DLL into a process space of the application (e.g. web browser). To do this, the extraction module: uses GetProcessAddress to find the LoadLibrary function Kernel32.dll; places the string with the path to the injected DLL into the web browser process space via the VirtualAllocEx and WriteProcessMemory; and invokes the CreateRemoteThread to launch a thread in the web browser process space using the LoadLibrary as the thread method, passing the string allocated in above as the only argument. Then, the injected DLL: pre-loads the SCHANNEL.DLL into the process space; finds the base of the crypto data structures; and hooks the crypto functions of SCHANNEL.DLL with custom functions. Next, when the application requests crypto functions, the hooked functions are called which then: call the original SCHANNEL functions; inspect the data structure found above for the crypto key material, it may also find the master secret as well; and return the values returned by the original SCHANNEL functions.

Figure 8:
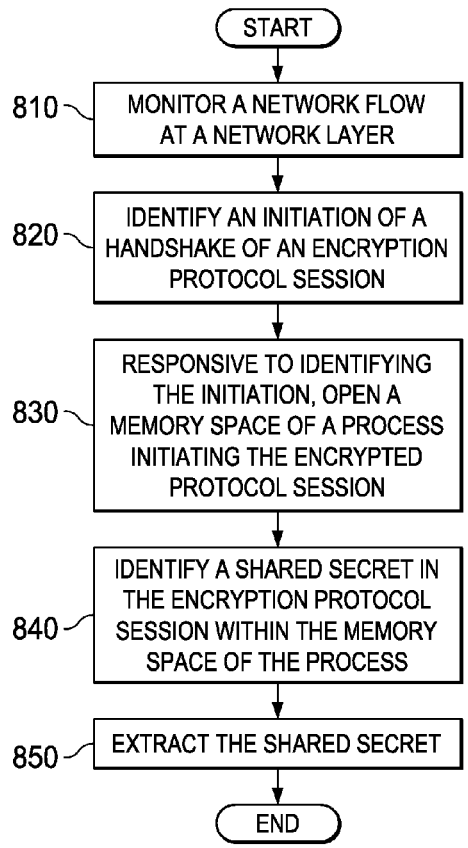
FIG. 8 is a simplified flowchart illustrating a process for extracting a shared secret from a memory space in accordance with an embodiment.

FIG. 8 is a simplified flowchart illustrating a process for extracting a shared secret from a memory space in accordance with an embodiment. A flow 800 may be a process that operates during and/or before an encryption protocol session. At 810, an extraction module monitors a network flow at a network layer. The extraction module is searching for an initiation of a handshake for the encryption protocol session.

At 820, the extraction module identifies the initiation of the handshake of the encryption protocol session. Responsive to identifying the initiation, at 830, the extraction module opens the memory space of a process initiating the encrypted protocol session. In one or more embodiments, the process may be an application.

At 840, the extraction module identifies a shared secret in the encryption protocol session within the memory space of the process. At 850, the extraction module extracts the shared secret. After 850, the extraction module may transmit the shared secret to a security module.

In operational terms, and in particular, one embodiment, an extraction module may hook into TCP streams looking for ClientHello messages. When a ClientHello message is found, and until the key material for the session is found, all TLS messages are inspected. The SessionID is extracted for the ServerHello message. Before and after each packet is processed by the inspected process the process is queried via the EnumProcessModules and ReadProcessMemory to: find if SCHANNEL.DLL is loaded; find the base of the crypto data structures in SCHANNEL.DLL; and find the key material for the session id found in the ServerHello message, it may also find the pre-master and/or master secret as well. Once the key material is found the key material is sent to a security module. This process may be extended to find the key material in FIG. 7, including those that are statically linked, by searching the process space for the proper data structures.

Figure 9:
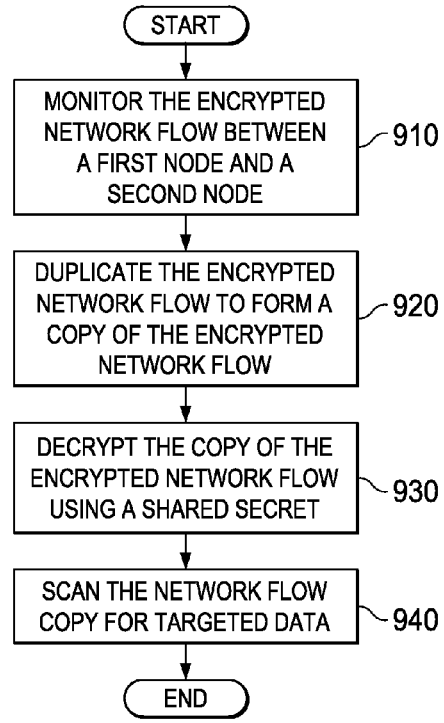
FIG. 9 is a simplified flowchart illustrating a process for analyzing an encrypted network flow in accordance with an embodiment.

FIG. 9 is a simplified flowchart illustrating a process for analyzing an encrypted network flow in accordance with an embodiment. A flow 900 may be a process that operates during an encryption protocol session. At 902, a security module monitors the encrypted network flow between a first node and a second node, the network flow initiated from the first node. In an embodiment, the first node may be a client and the second node may be a server. The encrypted network flow travels both ways between the first node and the second node.

At 904, the security module duplicates the encrypted network flow to form a copy of the encrypted network flow. At 906, the security module decrypts the copy of the encrypted network flow using a shared secret. The shared secret associated with the first node and the second node.

Both the first node and the second node know the shared secret. In an embodiment, the first node provides the shared secret. By knowing the shared secret, the security module can decrypt the network flow without interfering with the network flow.

At 908, the security module scans the network flow copy for targeted data. Targeted data may be data that is targeted by the client, user, security module, firewall, security software, policy server, or other entity.

Additionally, in one or more embodiments, an extraction module may extract the shared secret from the first node before 902. Additionally, in one or more embodiments, the security module may delay the encrypted network flow and forward the encrypted network flow as part of monitoring at 902. In that embodiment, the security module would delay forwarding to give time to scan the copy of the network flow. Responsive to identifying targeted data in the network flow copy, the security module may terminate the encrypted network flow.

Figure 10:
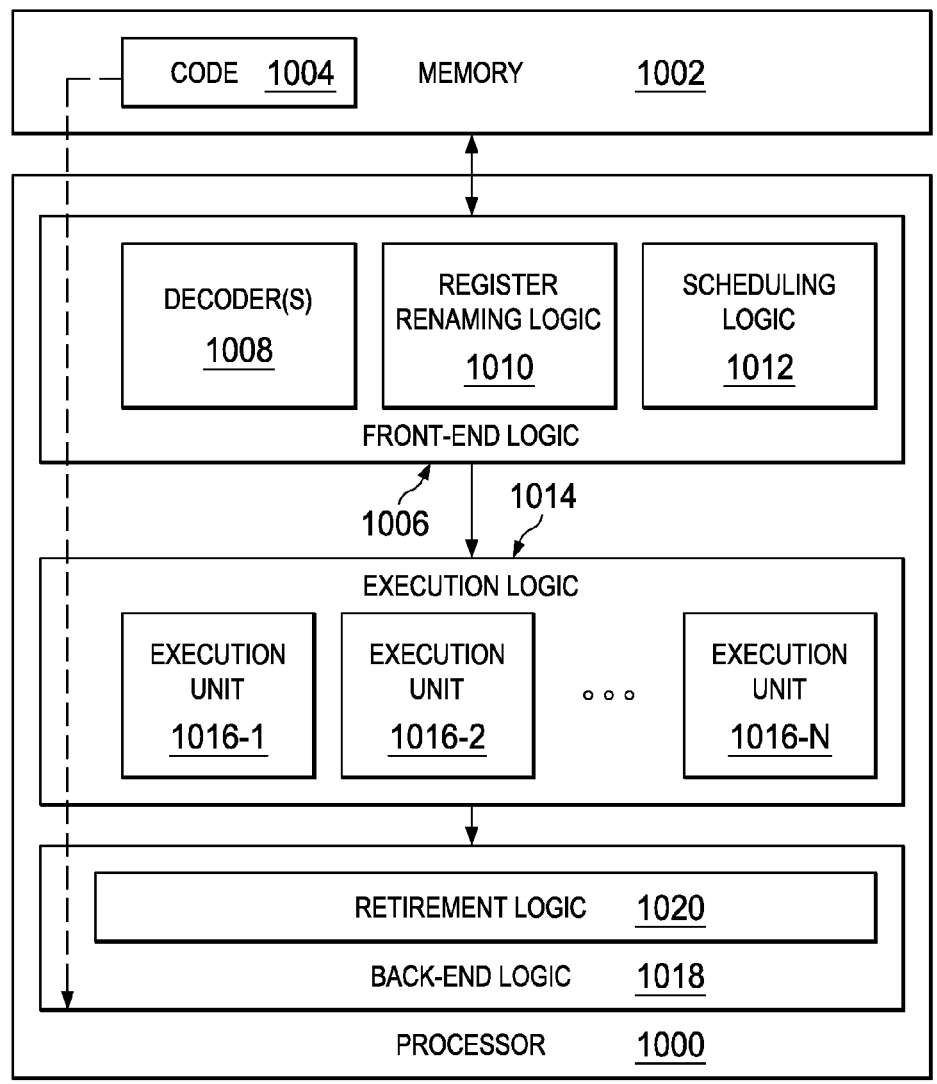
FIG. 10 also illustrates a memory coupled to processor in accordance with an embodiment.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. The memory 1002 may include code 1004, which may be one or more instructions, to be executed by processor 1000. Processor 1000 follows a program sequence of instructions indicated by code 1004. Each instruction enters a front-end logic 1006 and is processed by one or more decoders 1008. The decoder may generate as its output a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the convert instruction for execution.

Processor 1000 is shown including execution logic 1014 having a set of execution units 1016-1 through 1016-N. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 retires the instructions of code 1004. In one embodiment, processor 1000 allows out of order execution but requires in order retirement of instructions. Retirement logic 1020 may take a variety of forms as known to those of skill in the art (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not illustrated in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches.

Figure 11:
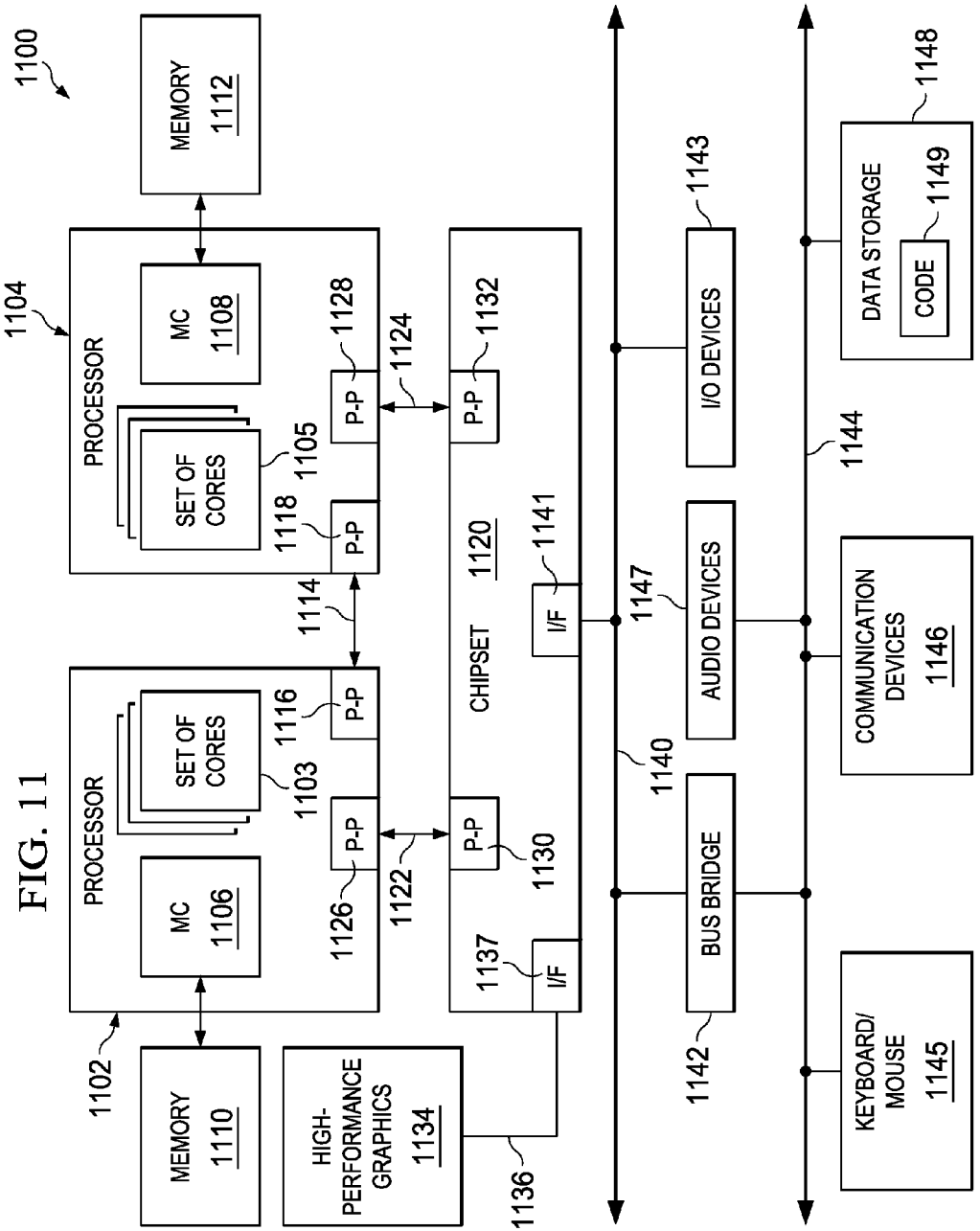
FIG. 11 illustrates a computing system that is arranged in a point-to-point (PtP) configuration according to an embodiment.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces.

As illustrated in FIG. 11, system 1100 may include several processors, of which only two, processors 1102 and 1104, are shown for clarity. Processors 1102 and 1104 may each include a set of cores 1103 and 1105 to execute multiple processes of a program. Processors 1102 and 1104 may also each include integrated memory controller logic (MC) 1106 and 1108 to communicate with memories 1110 and 1112. The memories 1110 and/or 1112 may store various data such as those discussed with reference to memory 1112. In alternative embodiments, memory controller logic 1106 and 1108 may be discrete logic separate from processors 1102 and 1104.

Processors 1102 and 1104 may be any type of a processor such as those discussed with reference to processor 102 of FIG. 1. Processors 1102 and 1104 may exchange data via a point-to-point (PtP) interface 1114 using point-to-point interface circuits 1116 and 1118, respectively. Processors 1102 and 1104 may each exchange data with a chipset 1120 via individual point-to-point interfaces 1122 and 1124 using point-to-point interface circuits 1126, 1128, 1130, and 1132. Chipset 1120 may also exchange data with a high-performance graphics circuit 1134 via a high-performance graphics interface 1136, using an interface circuit 1137, which could be a PtP interface circuit. In alternative embodiments, any or all of the PtP links illustrated in FIG. 11 could be implemented as a multi-drop bus rather than a PtP link.

At least one embodiment, as disclosed herein, may be provided within the processors 1102 and 1104. Other embodiments, however, may exist in other circuits, logic units, or devices within the system 1100 of FIG. 11. Furthermore, other embodiments may be distributed throughout several circuits, logic units, or devices illustrated in FIG. 11.

Chipset 1120 may be in communication with a bus 1140 via an interface circuit 1141. Bus 1140 may have one or more devices that communicate over it, such as a bus bridge 1142 and I/O devices 1143. Via a bus 1144, bus bridge 1143 may be in communication with other devices such as a keyboard/mouse 1145 (or other input device such as a touch screen, for example), communication devices 1146 (such as modems, network interface devices, or other types of communication devices that may communicate through a computer network), audio I/O device 1147, and/or a data storage device 1148. Data storage device 1148 may store code 1149 that may be executed by processors 1102 and/or 1104. In alternative embodiments, any portions of the bus architectures could be implemented with one or more PtP links.

The computer systems depicted in FIGS. 10 and 11 are schematic illustrations of embodiments of computing systems that may be utilized to implement various embodiments discussed herein. It will be appreciated that various components of the systems depicted in FIGS. 10 and 11 may be combined in a system-on-a-chip (SoC) architecture or in any other suitable configuration. For example, embodiments disclosed herein can be incorporated into systems such as, for example, mobile devices such as smart cellular telephones, tablet computers, personal digital assistants, portable gaming devices, etc. It will be appreciated that these mobile devices may be provided with SoC architectures in at least some embodiments.

Note that in certain example implementations, the security module and extraction module functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

In one example implementation, the security module and extraction module may include software in order to achieve the security activities outlined herein. The security module and extraction module can include memory elements for storing information to be used in achieving the security activities, as discussed herein. Additionally, the security module and extraction module may include a processor that can execute software or an algorithm to perform the security activities, as disclosed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Additionally, the security module and extraction module can be software, hardware, firmware or a combination thereof. Any of the memory items discussed herein (e.g., databases, tables, trees, caches, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the security module and extraction module (and their teachings) are readily scalable and can accommodate a large number of components, as well as more complicated/sophisticated arrangements and configurations. Accordingly, the examples provided should not limit the scope or inhibit the broad teachings of the security module and extraction module as potentially applied to a myriad of other architectures.

It is also important to note that the operations in the preceding flow diagrams illustrate only some of the possible scenarios and patterns that may be executed by, or within, a security module and extraction module. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A security module and an extraction module provide substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure.

The following examples pertain to embodiments in accordance with this Specification. One or more embodiments may provide a method for analyzing an encrypted network flow. The method may include: monitoring the encrypted network flow between a first node and a second node, the network flow initiated from the first node; duplicating the encrypted network flow to form a copy of the encrypted network flow; decrypting the copy of the encrypted network flow using a shared secret, the shared secret associated with the first node and the second node; and scanning the network flow copy for targeted data.

An example of an embodiment further comprises extracting the shared secret from the first node.

An example of an embodiment further comprises delaying the encrypted network flow; and forwarding the encrypted network flow.

An example of an embodiment further comprises, responsive to identifying targeted data in the network flow copy, terminating the encrypted network flow.

An example of an embodiment further comprises, responsive to identifying targeted data in the network flow copy, decrypting the encrypted network flow before forwarding using the shared secret; modifying the unencrypted network flow to remove the targeted data; and encrypting a modified network flow using the shared secret; and forwarding the modified network flow.

An example of an embodiment further comprises, wherein extracting the shared secret from the first node comprises: loading a shared library into an application on the first node, wherein the application is accessing the encrypted protocol session, and wherein the shared library allows access to an encryption protocol session through the application; and identifying the shared secret in the encryption protocol session.

An example of an embodiment further comprises, wherein extracting the shared secret from the first node comprises: monitoring a network flow at a network layer; identifying an initiation of a handshake of an encryption protocol session; responsive to identifying the initiation, opening a memory space of a process initiating the encrypted protocol session; and identifying the shared secret in the encryption protocol session within the memory space of the process.

An example of an embodiment comprises that the shared secret is at least one of a master secret, pre-master secret, session context. As used herein, the phrase "at least one of" may mean any one or combination of the list. For example, at least one of A, B, and C could mean A, B, or C, or any combination thereof.

An example of an embodiment further comprises limiting a number of encryption methods used to encrypt a network flow between the first node and the second node.

One or more embodiments provide a method, apparatus, and/or machine accessible storage medium for extracting a shared secret from a first node. The method includes loading a shared library into an application on the first node, wherein the application is accessing the encrypted protocol session, and wherein the shared library allows access to an encryption protocol session through the application; and identifying the shared secret in the encryption protocol session.

One or more embodiments provide a method, apparatus, and/or machine accessible storage medium for extracting a shared secret from a first node. The method includes monitoring a network flow at a network layer; identifying an initiation of a handshake of an encryption protocol session; responsive to identifying the initiation, opening a memory space of a process initiating the encrypted protocol session; and identifying the shared secret in the encryption protocol session within the memory space of the process.

An example of an embodiment further comprises extracting the shared secret from the memory space of the process.

An example of an embodiment further comprises sending the shared secret to a security module.

One or more embodiments provide an apparatus. The apparatus comprising a security module configured to monitor the encrypted network flow between a first node and a second node, the network flow initiated from the first node; duplicate the encrypted network flow to form a copy of the encrypted network flow; decrypt the copy of the encrypted network flow using a shared secret, the shared secret associated with the first node and the second node; and scan the network flow copy for targeted data.

An example of an embodiment further comprises an extraction module configured to extract the shared secret from the first node.

An example of an embodiment further comprises, wherein the security module is further configured to: delay the encrypted network flow; and forward the encrypted network flow.

An example of an embodiment further comprises, wherein the security module is further configured to: responsive to identifying targeted data in the network flow copy, terminate the encrypted network flow.

An example of an embodiment further comprises, wherein the security module is further configured to: responsive to identifying targeted data in the network flow copy, decrypt the encrypted network flow before forwarding using the shared secret; modify the unencrypted network flow to remove the targeted data; encrypt a modified network flow using the shared secret; and forward the modified network flow.

An example of an embodiment further comprises, wherein the extraction module being configured to extract the shared secret from the first node comprises the extraction module being configured to: load a shared library into an application on the first node, wherein the application is accessing the encrypted protocol session, and wherein the shared library allows access to an encryption protocol session through the application; and identify the shared secret in the encryption protocol session.

An example of an embodiment further comprises, wherein the extraction module being configured to extract the shared secret from the first node comprises the extraction module being configured to: monitor a network flow at a network layer; identify an initiation of a handshake of an encryption protocol session; responsive to identifying the initiation, open a memory space of a process initiating the encrypted protocol session; and identify the shared secret in the encryption protocol session within the memory space of the process.

An example of an embodiment further comprises, wherein the shared secret is at least one of a master secret, pre-master secret, session context.

An example of an embodiment further comprises, wherein the security module is further configured to: limit a number of encryption methods used to encrypt a network flow between the first node and the second node.

One or more embodiments provide at least one machine accessible storage medium having instructions stored thereon for analyzing an encrypted network flow, the instructions when executed on a machine, cause the machine to: monitor the encrypted network flow between a first node and a second node, the network flow initiated from the first node; duplicate the encrypted network flow to form a copy of the encrypted network flow; decrypt the copy of the encrypted network flow using a shared secret, the shared secret associated with the first node and the second node; and scan the network flow copy for targeted data.

An example of an embodiment further comprises instructions, when executed on the machine, cause the machine to: extract the shared secret from the first node.

An example of an embodiment further comprises instructions, when executed on the machine, cause the machine to: delay the encrypted network flow; and forward the encrypted network flow.

An example of an embodiment further comprises instructions, when executed on the machine, cause the machine to: responsive to identifying targeted data in the network flow copy, terminate the encrypted network flow.

An example of an embodiment further comprises instructions, when executed on the machine, cause the machine to: responsive to identifying targeted data in the network flow copy, decrypt the encrypted network flow before forwarding using the shared secret; modify the unencrypted network flow to remove the targeted data; and encrypt a modified network flow using the shared secret; and forward the modified network flow.

An example of an embodiment further comprises, wherein the instructions, when executed on the machine, cause the machine to extract the shared secret from the first node, further comprises instructions, when executed on the machine, cause the machine to: load a shared library into an application on the first node, wherein the application is accessing the encrypted protocol session, and wherein the shared library allows access to an encryption protocol session through the application; and identify the shared secret in the encryption protocol session.

An example of an embodiment further comprises, wherein the instructions, when executed on the machine, cause the machine to extract the shared secret from the first node, further comprises instructions, when executed on the machine, cause the machine to: monitor a network flow at a network layer; identify an initiation of a handshake of an encryption protocol session; responsive to identifying the initiation, open a memory space of a process initiating the encrypted protocol session; and identify the shared secret in the encryption protocol session within the memory space of the process.

An example of an embodiment further comprises, wherein the shared secret is at least one of a master secret, pre-master secret, session context.

An example of an embodiment further comprises instructions, when executed on the machine, cause the machine to limit a number of encryption methods used to encrypt a network flow between the first node and the second node.

What is claimed is:

1. At least one non-transitory machine accessible storage medium including code that, when executed by one or more processors, is to:

load a shared library into an application accessing an encryption protocol session on a first node;
use the shared library to access the encryption protocol session through the application;
identify a shared secret from a cryptographic structure called by the application;
extract the shared secret from the encryption protocol session; and
communicate the shared secret to a security module of a network appliance, wherein the network appliance is to receive a network flow of the encryption protocol session established between the first node and a second node, and wherein the network flow is to be decrypted by the network appliance based, at least in part, on the shared secret.

2. The at least one non-transitory machine accessible storage medium of claim 1, wherein accessing the encryption protocol session includes:
identifying the cryptographic structure in the application; and
hooking the cryptographic structure with one or more extraction functions.

3. The at least one non-transitory machine accessible storage medium of claim 2, wherein the shared secret is identified and extracted by executing the one or more extraction functions.

4. The at least one non-transitory machine accessible storage medium of claim 3, wherein the extraction functions are executed responsive to the cryptographic structures being called.

5. The at least one non-transitory machine accessible storage medium of claim 1, wherein the shared secret is communicated to the security module after a handshake associated with the encryption protocol session occurs between the first node and the second node.

6. The at least one non-transitory machine accessible storage medium of claim 1, wherein the shared secret is at least one of a master secret, pre-master secret, or a session context.

7. The at least one non-transitory machine accessible storage medium of claim 1, wherein the shared library is to allow access to the encryption protocol session through the application.

8. The at least one non-transitory machine accessible storage medium of claim 1, wherein the code, when executed by the one or more processors, is to:
modify a handshake of the encryption protocol session to adjust parameters to be negotiated between the first node and the second node.

9. The at least one non-transitory machine accessible storage medium of claim 8, wherein a modification of the handshake of the encryption protocol session includes a limit on a number of encryption methods used to encrypt a network flow between the first node and the second node.

10. An apparatus, comprising:
at least one processor coupled to at least one memory element; and
logic stored in the at least one memory element, wherein the logic is executable by the at least one processor to:
load a shared library into an application accessing an encryption protocol session on a first node;
use the shared library to access the encryption protocol session through the application;
identify a shared secret from a cryptographic structure called by the application;
extract the shared secret from the encryption protocol session; and
communicate the shared secret to a security module of a network appliance, wherein the network appliance is to receive a network flow of the encryption protocol session established between the first node and a second node, and wherein the network flow is to be decrypted by the network appliance based, at least in part, on the shared secret.

11. The apparatus of claim 10, wherein accessing the encryption protocol session includes:
identifying the cryptographic structure in the application; and
hooking the cryptographic structure with one or more extraction functions, wherein the shared secret is identified and extracted by executing the one or more extraction functions.

12. The apparatus of claim 11, wherein the extraction functions are executed responsive to the cryptographic structures being called.

13. The apparatus of claim 10, wherein the shared secret is communicated to the security module after a handshake associated with the encryption protocol session occurs between the first node and the second node.

14. The apparatus of claim 10, wherein the shared library is to allow access to the encryption protocol session through the application.

15. The apparatus of claim 10, wherein the logic is executable by the at least one processor to:
modify a handshake of the encryption protocol session to adjust parameters to be negotiated between the first node and the second node.

16. A method, comprising:
loading a shared library into an application accessing an encryption protocol session on a first node;
using the shared library to access the encryption protocol session through the application;
identifying a shared secret from a cryptographic structure called by the application;
extracting the shared secret from the encryption protocol session; and
communicating the shared secret to a security module of a network appliance, wherein the network appliance is to receive a network flow of the encryption protocol session established between the first node and a second node, and wherein the network flow is to be decrypted by the network appliance based, at least in part, on the shared secret.

17. The method of claim 16, further comprising:
identifying the cryptographic structure in the application; and
hooking the cryptographic structure with one or more extraction functions, wherein the shared secret is identified and extracted by executing the one or more extraction functions.

18. The method of claim 16, further comprising:
modifying a handshake of the encryption protocol session to adjust parameters to be negotiated between the first node and the second node.

19. A system, comprising:
at least one processor coupled to at least one memory element;
an extraction module comprising first code that, when executed by the at least one processor, is to:
load a shared library into an application accessing an encryption protocol session on a first node;
use the shared library to identify a shared secret from a cryptographic structure called by the application; and extract the shared secret from the encryption protocol session; and
a network device including one or more processors comprising second code that, when executed by the one or more processors, is to:
receive the shared secret from the first node after the shared secret is extracted;
intercept an encrypted network flow of the encryption protocol session between the first node and a second node;
create a copy of the encrypted network flow;
decrypt the copy of the encrypted network flow using the shared secret received from the extraction module to form a decrypted network flow; and
scan the decrypted network flow for targeted data.

20. The system of claim 19, wherein the extraction module, when executed by the at least one processor, is to: communicate the shared secret to a security module after a handshake associated with the encryption protocol session occurs between the first node and the second node.

21. The system of claim 19, wherein the extraction module executes on the first node or on another node.

* * * * *

UNITED STATES PATENT AND TRADEMARK OFFICE
CERTIFICATE OF CORRECTION

PATENT NO. : 9,893,897 B2  
APPLICATION NO. : 14/929476  
DATED : February 13, 2018  
INVENTOR(S) : Xiaoning Li et al.

Page 1 of 1

It is certified that error appears in the above-identified patent and that said Letters Patent is hereby corrected as shown below:

In the Drawings

On Sheet 5 of 8, in Figure 6, reference numeral 608, Line 5, delete "cupher_suite_id" and insert -- cipher_suite_id --, therefor.

Signed and Sealed this  
Fourteenth Day of August, 2018

Andrei Iancu  
*Director of the United States Patent and Trademark Office*